United States Patent [19]

Dosmond

[11] 4,452,620

[45] Jun. 5, 1984

[54] INSTALLATION FOR CENTRAL HEATING AND/OR FOR THE PRODUCTION OF HOT WATER FOR SANITARY OR INDUSTRIAL PURPOSES

[76] Inventor: René Dosmond, "La Poussiniere"-Hameau de la Jonchère-Chemin des Vignes, 92500 Rueil Malmaison, France

[21] Appl. No.: 239,562

[22] Filed: Mar. 2, 1981

[30] Foreign Application Priority Data

Mar. 7, 1980 [FR] France .................... 80 05249

[51] Int. Cl.³ ........................................... F25B 27/02
[52] U.S. Cl. .................... 62/238.6; 237/2 B; 165/134 DP
[58] Field of Search ............... 237/2 B; 165/DIG. 12, 165/DIG. 2, 134 DP; 62/238.6

[56] References Cited

U.S. PATENT DOCUMENTS

| | | | |
|---|---|---|---|
| 4,112,705 | 9/1978 | Sisk et al. ................ | 62/238.6 |
| 4,147,135 | 4/1979 | Herbst .................... | 165/134 DP X |
| 4,227,647 | 10/1980 | Eriksson ................. | 237/2 B |
| 4,240,404 | 12/1980 | Franchina ............... | 165/DIG. 12 |
| 4,287,723 | 9/1981 | Dosmond ................ | 237/2 B |
| 4,300,920 | 11/1981 | Grove .................... | 165/134 DP |

FOREIGN PATENT DOCUMENTS 2728722 12/1977 Fed. Rep. of Germany ..... 62/238.6
2624962  1/1979 Fed. Rep. of Germany ..... 62/238.6

Primary Examiner—Albert J. Makay
Assistant Examiner—Henry Bennett
Attorney, Agent, or Firm—John T. Synnestvedt; Albert L. Free

[57] ABSTRACT

Installation for central heating and/or production of hot water for sanitary or industrial purposes in which there is recovered on the evaporators of heat-pump circuits the enthalpy of smoke coming from the boiler and from outside air introduced into the installation through air inlets.

Before being brought to the evaporators, the smoke is possibly cooled, however without being brought to dew point, and the heat thus produced in an exchange circuit is recovered for reheating, before its discharge into the atmosphere, of the smoke and outside air mixture so as to recreate a chimney effect, the gases discharged being hot and dry.

1 Claim, 1 Drawing Figure

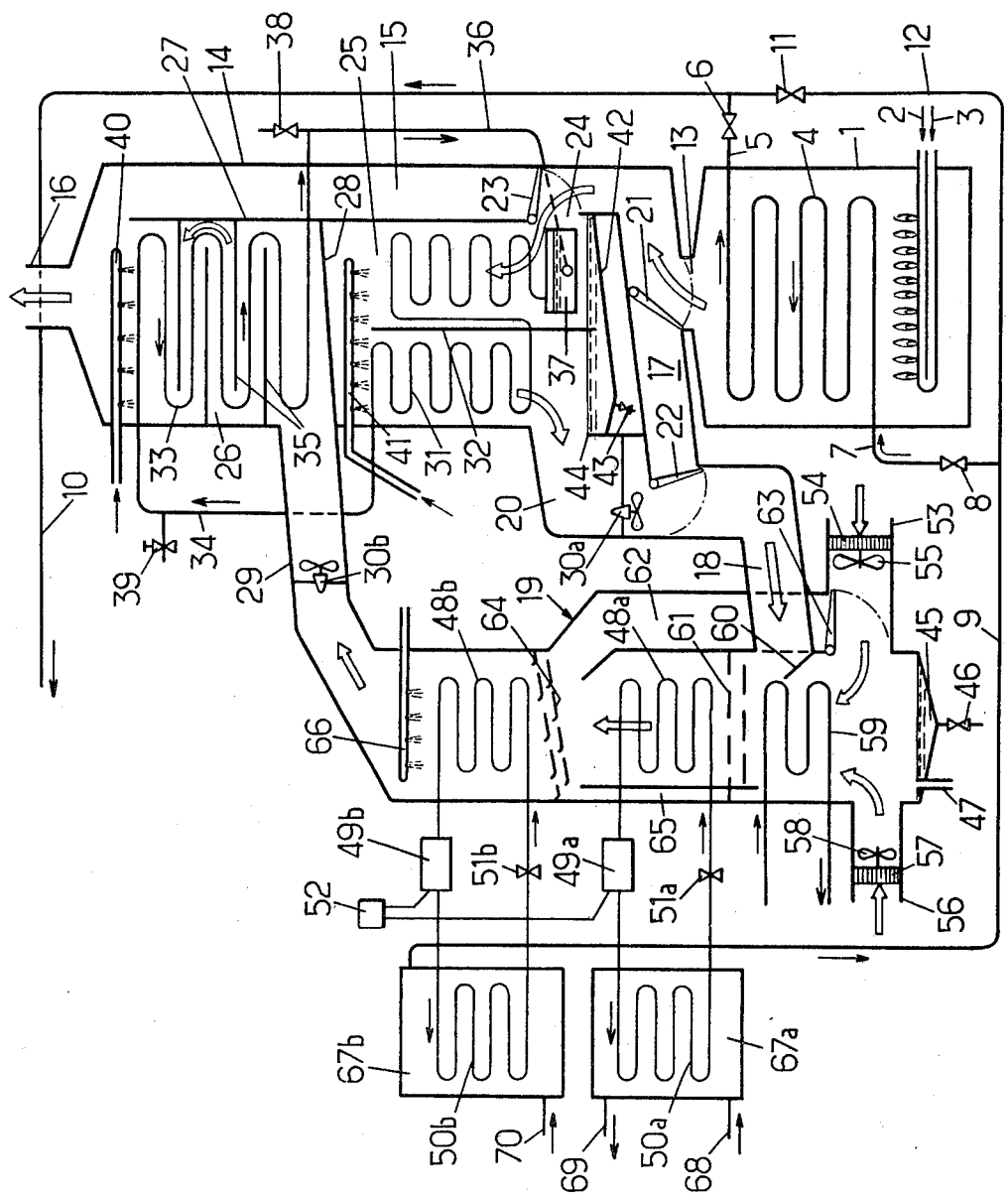

INSTALLATION FOR CENTRAL HEATING AND/OR FOR THE PRODUCTION OF HOT WATER FOR SANITARY OR INDUSTRIAL PURPOSES

The present invention relates to a central heating and/or hot-water production installation of the type using at least one conventional heat source such as a liquid or gas-fuel boiler and at least one thermodynamic heat-pump heat source, particularly of the compression heat cycle kind formed from a closed circuit in which flows a refrigerating fluid and comprising in series, in a way known per se, an evaporator, a compressor, a condenser forming the thermodynamic heat source properly speaking and an expansion member for the condensed refrigerating fluid, one or more circuits for the circulation of the heat-carrying fluid of the central heating and for the production of sanitary or industrial hot water being furthermore provided and arranged to be the seat of heat exchanges with said above-mentioned heat sources, in which installation at least one heat-pump evaporator is situated in an exchange body serving for discharging the combustion gases from the boiler, there being provided in connection with the exchange body, upstream of said evaporator, one or more external air intakes provides with flow-regulating means.

Of course, this kind of installation may comprise one or more boilers and one or more heat circuits, depending on the application in view. These installations may in this respect be provided for heating dwelling premises, premises for industrial or commercial use or else agricultural premises, for the whole or part of a year, and the hot water produced may also be used for different purposes, for example for sanitary or industrial purposes. As for the heat-carrying fluid of the central heating, it should be understood also that it may be any appropriate fluid, for example water or air. An installation of the kind in question in described in French Patent Application No. 79 05660 filed on Mar. 5, 1979 in the name of the applicant.

The aims and advantages of such an installation have been amply set forth in this patent application.

One of its essential advantages resides in the fact that, on the one hand, it turns to account the superior heating power of the fuel used and, on the other hand, makes use (when the atmospheric and other conditions are favorable) of the enthalpy of the humid external air which is induced to mix with the smoke from the boiler.

From this point of view, provision was made for bringing the gases escaping from the chimney not only to the lowest possible degree of humidity but also to the lowest possible temperature, i.e. to a temperature little above 0° C.

However, the natural chimney effect was thus lost and larger fans had to be provided for causing the gases to ascend therein, which increases the amount of electric power consumed in the installation.

Moreover and especially, it is then difficult to avoid a much more serious drawback, which is that of the pollution of the environment.

In fact, and even if there is a wind, the cold mixture of combustion gases and air removed from the chimney, and which contains a high proportion of carbonic gas, cannot rise sufficiently in the atmosphere and disperse, because of its density which is too high; there are fallouts and these gases thus pollute the outside air in the neighborhood of the installation.

The aim of the present invention is essentially to remedy these drawbacks.

To this end, an installation of the type mentioned at the beginning is characterized, in accordance with the invention, in that it comprises heat-exchange means able to be inserted in the path followed by the combustion gases leaving said boiler, these means being arranged on the one hand to remove a part of the perceptible heat of these gases, without bringing them to dew point, and before they reach, possibly mixed with the outer air, the evaporator or evaporators of said exchange body and, on the other hand, to restore to the dried and cooled gases coming from said body the heat previously removed, and thus bring them back to a temperature substantially greater than 0° C. before they finally escape up the chimney. It will be understood that the dried gases referred to are dried in the sense that a substantial amount of water vapor has been removed from them by condensation at the evaporators in said body, even though the relative humidity of these gases is high at this point in the system.

It can be seen that the principle of the invention is now based on the abandonment of the idea of discharging smoke into the atmosphere at the lowest possible temperature.

On the contrary, it is arranged for the outgoing smoke to have a sufficient temperature (for example up to 150° C. or more) for recreating a certain chimney effect and for rising and dispersing in the atmosphere. Thus it is possible to reduce the power to be consumed for remedying the lack of natural draft and for obtaining removal of the smoke, as well as to avoid the above-described polluting effect.

However, of course, and as will be readily understood from reading the above-given definition of the invention, it is arranged for the gases leaving the chimney to be dry, so as not to lose their latent heat, which must be wholly recovered in said exchange body, as is the case with the above-mentioned French Patent Application No. 79 05660. Thus the heat losses are limited. It will be understood that the heated gases leaving the chimney are dry in the sense that they have a low relative humidity, due to their heating.

An installation in accordance with the invention may be further characterized in that said heat-exchange means are disposed, for the part removing heat from the smoke leaving the boiler, in a cooling chamber comprising an inlet able to be placed in communication with the boiler and an outlet able to be placed in communication with an inlet of said exchange body which contains the heat-pump evaporator(s) and, for the part for restoring heat to said dried and cooled gases leaving said body, in a heating chamber comprising an inlet in communication with the outlet of said exchange body, and an outlet in communication with the chimney.

These exchanger means, chambers and all elements associated therewith may be advantageously disposed in a duct similar to the one which was called "evacuation duct" in the above-mentioned French patent application, this duct being situated directly between the boiler and the chimney of the installation, whereas the exchange body is offset laterally with respect to this unit.

According to another interesting characteristic of the invention, the installation may further comprise a first by-pass duct for placing the boiler in direct communication with the chimney, with cutting off of said chambers and the exchange body, and a second by-pass duct for placing the boiler in direct communication with said exchange body, similarly with cutting off of said chambers.

Thus there may be cut off, possibly manually but preferably automatically, the two above-mentioned chambers and if need be also and at the same time said exchange body, which offers three different operating possibilities, and this particularly depending on the conditions external to the installation—atmospheric and others—and on the heating demands for sanitary hot water or for heating water or air.

Furthermore, in accordance with one possible embodiment of the heat-exchange means, it may be arranged for them to be formed by a closed heat-carrying fluid circuit, comprising successively and in series, a supplementary boiler shell and an evaporator situated in said cooling chamber, a condenser situated in said heating chamber and a return duct between the outlet of the condenser and said supplementary boiler shell.

An embodiment of the invention will now be described by way of example which is in no wise limiting, with reference to the single FIGURE of the accompanying drawing which shows schematically an installation putting into effect the arrangements described above and other subsidiary or complementary arrangements.

The installation shown in the FIGURE comprises a boiler 1 with a heating shell, preferably of the pressurized type, similar to that of a conventional boiler, provided with a combustible-fluid inlet 2 and a combustive-air inlet 3. The fluid and air flow rates are adjustable and the air intake 3 may be regulated to a flow rate substantially greater than that which would just allow stoechiometric combustion of the fuel. There is shown in the form of a coil 4 the hot-water production circuit of the boiler, this water leaving by outlet 5, provided with a valve 6, and returning to said circuit—cooled after use—through an inlet 7 provided with a valve 8.

There is shown at 9 the duct bringing the water to be heated (or other heat-carrying fluid) to the boiler, i.e. cooled water coming from the user circuit, and at 10 the duct through which the hot water leaving boiler 1 returns to said circuit; it may be in particular a central-heating circuit. A valve 11 provided in a by-pass duct 12 allows the boiler 1 to be cut out of the circuit, when operation thereof is pointless (in hot weather) or for any other reason.

The outlet 13 for the combustion gases from the boiler forms at the same time the inlet to what may be called an evacuation duct, referenced at 14, and which extends directly between boiler 1 and the chimney 16 of the installation.

This duct 14 comprises laterally a first by-pass conduit 15 for putting the outlet 13 of the boiler into direct communication with the chimney 16; duct 14 comprises further, at its lower part, a second by-pass conduit 17 for putting this outlet 13 into direct communication with the inlet 18 of an exchange body 19, this inlet 18 being connected to the outlet 20 of evacuation duct 14.

Three flaps 21, 22 and 23 enable different combinations to be obtained for the flow of gases between boiler 1, evacuation duct 14, chimney 16 and the exchange body 19.

Flap 21 enables the combustion gases from the boiler to be directed either towards evacuation duct 14 (case shown in the FIGURE), or towards the second by-pass conduit 17; flap 22, when it occupies the position opposite that which is shown in the FIGURE, allows said conduit 17 to be placed in communication with the inlet 18 of exchange body 19, while shutting off the outlet 20 of evacuation duct 14; and flap 23 enables, in the position opposite that which is shown in the FIGURE, the outlet 13 of the boiler to be placed in communication with the first by-pass conduit 15 and chimney 16.

In the position shown in the FIGURE, on the other hand, flap 23 closes conduit 15 and places the outlet 13 of boiler 1 in communication with the inlet 24 of a cooling chamber 25 whose outlet forms the above-mentioned outlet 20 of duct 14.

This chamber 25 and a heating chamber 26 situated thereabove and which communicates freely with chimney 16, are separated from conduit 15 by a vertical common dividing wall 27, and one from the other by a dividing wall 28 sloping downwards and towards exchange body 19. This dividing wall 28 also forms the bottom of a duct 29, possibly fitted with a fan 30b, and which communicates the upper part of said exchange body 19 with heating chamber 26.

What were called above the heat-exchange means comprise: an evaporator 31 in two parts disposed in each of the two compartments formed by a wall 32 in cooling chamber 25; a condenser 33 connected to evaporator 31 through a conduit 34 and the shape of which follows a coiled path formed in heating chamber 26 by baffles 35; and a return conduit 36 for returning the condensates to a water-space 37 provided at the inlet to cooling chamber 25. The heat-carrying fluid which flows in the closed circuit thus formed, in the direction shown by the arrows, may be advantageously water. In the drawings, the direction of movement of the gases which sweep the outside of the different conduits (with fins or similar for the heat-exchange parts) has been shown by thick arrows, and the flow directions inside said conduits by thin arrows.

At 38 there is shown a normally closed valve for filling, in the open position, the above-described exchange circuit and, in conduit 34, a safety valve 39.

It should be noted that the flow of water in said circuit does not require the presence of a compressor and a pressure reducer, for the temperature of gases which sweep evaporator 31, coming directly from the boiler, are at a higher temperature than those which sweep condenser 33.

In the upper part of heating chambers 26 and cooling chambers 25 there are provided spraying manifolds, respectively 40 and 41, supplied with cleaning product, for example intermittently, and the bottom of chamber 25 is given the form of a tray 42 for receiving the cleaning water, provided with a drain valve 43 and an overflow 44, for discharging the water to a condensate-receiving tray 45, provided at the bottom of exchange body 19. This tray is also provided with a drain valve 46 and an overflow 47.

With exchange body 19 there are associated, for forming the thermodynamic heat source mentioned at the beginning, two compression heat-pump circuits each comprising, in a conventional way, an evaporator 48a, 48b, a compressor 49a, 49b, a condenser 50a, 50b and a pressure reducer 51a, 51b. The two evaporators are disposed one above the other in body 19, so that the two heat-pump circuits operate under different temperature conditions. The operation of these circuits, through which flows a refrigerating fluid such as fluorocarbon, is furthermore well-known and will not be further described.

As was indicated in the above-mentioned French patent application, there is provided in any case, preferably, an automatic device 52 adapted to prevent the two compressors from starting up at the same time, so as to limit the peak current demands.

Besides the input 18 for the combustion gases coming from boiler 1, exchange body 19 comprises at its lower part external-air inlets, for example a humid atmospheric air inlet 53 provided with a filter 54 and a fan 55 and an inlet 56 for polluted air also humid, provided with a filter 57 and a fan 58. The two fans may be variable-speed fans, so as to allow adjustment of the two air-flow rates depending on the operating conditions.

Between these air inlets and the lower evaporator 48a there is provided another tubular finned exchanger 59 supplied by any subsidiary heat source, formed for example by recovery of warm waste water, a geothermic source, etc., which preheats the humid air penetrating into body 19 before it passes through the evaporators.

At the level of this exchanger 59, there is shown at 60 a deflector for upwardly deflecting the combustion gases coming from boiler 1. At 61, there is shown a baffle barrier for making homogeneous the gas and air mixture arriving in exchange body 19 through inlets 18, 53 and 56.

At 62, there is shown a by-pass duct whose inlet may be closed by a flap 63 and, when this flap is open, the atmospheric air entering at 53 can only pass through the upper evaporator 48b.

The outlet of duct 62 emerges under another barrier of baffles 64 also for making the gaseous mixtures homogeneous at this level and which are shaped as gutters for receiving the condensates coming from the upper evaporator 48b which is the coldest. The condensates may then follow a downpipe 65 to fall into tray 45, without cooling the lower evaporator 48a.

At the upper part of body 19 there is provided another spraying manifold 66 for cleaning the two evaporators; it may also operate intermittently.

As a whole, the exchange body 19 and its fittings operate in the same way as in the above-mentioned French patent application. It is not necessary to describe again this operation. It is sufficient to recall that this part of the installation allows the superior heating power of the fuel burned in boiler 1 to be turned to account, while avoiding loss of the latent heat of the combustion gases and, if necessary, the enthalpy source formed by the outside air to be used when it is sufficiently warm and humid, as well as that of polluted air which may be recovered from inhabited premises, that coming from warm waste water, etc. The heat thus recovered indirectly, and even when the boiler is not operating, may be used in exchange volumes such as 67a and 67b receiving heat from condensers 50a and 50b respectively and through which passes a fluid to be heated, for the production, by means of an additional exchange volume if necessary, of hot water for sanitary or industrial purposes (cold or warm water inlet at 68 and hot water outlet at 69, for the exchange volume 67a).

The different heat sources described above may also be combined and exchange volume 67b may for example be used for preheating the water (or other cooled fluid) coming from the installation for heating premises (return shown at 70), before returning it to the circuit 4 of boiler 1 through duct 9. Adequate circulators-distributors (not shown) will in any case enable the flow paths of the fluids to be heated to be modified at leisure automatically depending on different appropriate parameters (distribution of the heat requirements, external conditions, safety conditions, etc.).

Similarly, any means for detection of temperatures, pressures and other parameters may of course be provided and all servo-controls for the selective starting up or stopping of the burners, fans, compressors and other apparatus, the opening or the closing of valves and flaps, etc., so as to obtain at all times the optimum operating conditions for the whole installation, i.e. with the best possible efficiency and with all desirable safety precautions.

As for the antipollution part of the installation, it will especially be brought into action, as a rule, when the outside temperature is low, the risk of pollution being greater for this reason and when there is a large preponderance of combustion gases with respect to the outside air (case where fan 55 may be stopped, with starting up of a fan 30a situated in duct 20).

Flaps 21 to 23 are then moved into the position shown in the FIGURE, and the combustion gases from the boiler are thus cooled on evaporator 31, supplying heat to the heat-carrying fluid of the heat circuit 31, 34, 33, 36. However, these gases are maintained above their dew point, so that all the latent heat from vaporization of the water vapor which they contain is retained therein and may be wholly recovered at the evaporators 48a and 48b of exchange body 19, at the same time as the enthalpy remainder still available after this precooling.

Thus, the dried and cooled mixture coming from exchange body 19 and sucked into duct 29 by fan 30 may be reheated by condenser 33 in the heating chamber, before being discharged at 16 through the chimney effect thus recreated; the dry smoke may then rise in the atmosphere and be dispersed, which will avoid any risk of polluting the environment.

When there is no risk of pollution, on the other hand, flaps 21 and 22 may be swung to the position opposite that which is shown in the FIGURE and the discharge duct 14 is thus cut out of the circuit, the smoke from the boiler arriving directly in the exchange body 19 without passing through cooling chamber 25.

In the case of malfunction (for example appearance of an over-pressure at evaporator 48a or 48b) and if, for any other reason, exchange body 19 must be cut off from the circuit, this may be simply achieved by bringing flap 21 back to the position shown in the FIGURE, and by pivoting flap 23 to establish direct communication between the outlet 13 of the boiler and chimney 16, through by-pass conduit 15. The discharge of smoke then takes place in a quite conventional way.

As is evident, and as it follows moreover already from what has gone before, the invention is in no wise limited to those of its modes of application and embodiments which have been more especially considered; it embraces, on the contrary, all variations thereof.

I claim:

1. A central heating and/or hot-water production installation, of the type comprising at least one conventional heat source of the liquid or gaseous fuel boiler kind, and at least one thermodynamic heat source with heat pump, particularly of the compression heat-cycle kind formed from a closed circuit in which flows a refrigerating fluid and comprising in series, in a known way, an evaporator, a compressor, a condenser forming the thermodynamic heat source properly speaking and an expansion member for the condensed refrigerating fluid, one or more circuits for the circulation of the heat-carrying fluid of the central heating and for the production of hot water for sanitary or industrial purposes being furthermore provided and arranged so as to be in heat-exchange relation with said above-mentioned heat sources, in which installation at least one heat-pump evaporator is situated in an exchange body serving for the discharge of combustion gases from the boiler, in connection with this exchange body being provided, upstream of said evaporator, one or more external-air inlets provided with flow-regulation means, characterized in that said installation comprises heat-exchange means able to be inserted in the path followed by the combustion gases coming from said boiler, these means being arranged on the one hand to take up a part of the perceptible heat of these gases, without bringing them to dew point, and before they arrive, possibly mixed with outside air, at the evaporator(s) of said exchange body and, on the other hand, for restoring to the relatively dried and cooled gases leaving said body the heat previously taken away and thus bringing them to a temperature substantially greater than 0° C., before they finally escape through the chimney, said heat-exchange means being disposed for the part taking heat from smoke leaving the boiler, in a cooling chamber comprising an inlet able to be placed in communication with the boiler and an outlet able to be placed in communication with an inlet of said exchange body which contains the heat-pump evaporator(s) and, for the part restoring heat to said relatively dried and cooled gases leaving said body, in a heating chamber comprising an inlet in communication with the outlet of said exchange body and an outlet in communication with the chimney;

wherein said installation comprises a first by-pass conduit for placing the boiler in direct communication with the chimney, with said chambers and said exchange body being cut out of the circuit, and a second by-pass conduit for placing the boiler in direct communication with said exchange body, with said chambers being similarly cut out of the circuit.

* * * * *